UNITED STATES PATENT OFFICE.

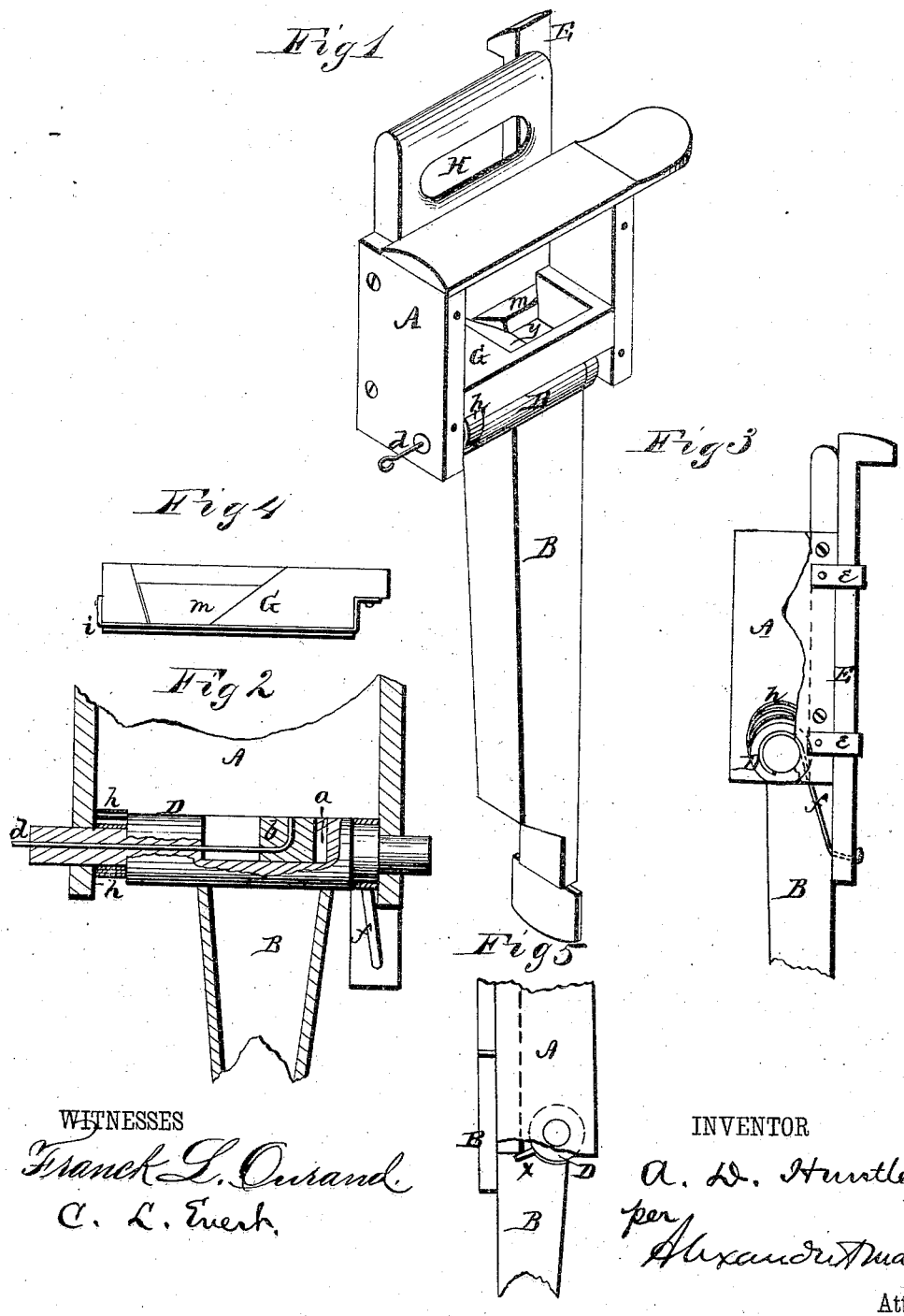

ABIEL D. HUNTLEY, OF HOULTON, MAINE, ASSIGNOR TO W. H. ESTY, OF SAME PLACE.

IMPROVEMENT IN HAND SEED-PLANTERS.

Specification forming part of Letters Patent No. 155,519, dated September 29, 1874; application filed June 13, 1874.

*To all whom it may concern:*

Be it known that I, ABIEL D. HUNTLEY, of Houlton, in the county of Aroostook and in the State of Maine, have invented certain new and useful Improvements in Hand Seed-Planter; and do hereby declare that the following is a full, clear, and exact description thereof, reference being had to the accompanying drawings and to the letters of reference marked thereon, making a part of this specification.

The nature of my invention consists in the construction and arrangement of a hand-machine for planting corn, beans, peas, and garden or other small seeds, as will be hereinafter more fully set forth.

In order to enable others skilled in the art to which my invention appertains to make and use the same, I will now proceed to describe its construction and operation, referring to the annexed drawing, in which—

Figure 1 is a perspective view of my hand seed-planter. Fig. 2 is an enlarged longitudinal section through the dropping-roller. Fig. 3 is a side view of the seed-box, partly broken open to show the dropping-cylinder. Fig. 4 is a view of the bottom of the seed-box. Fig. 5 is a view of the side of the seed-box opposite to that shown in Fig. 3.

A represents the seed-box, which either forms a part of, or is secured to, the upper end of a hollow shank, B. This shank is open at its lower end, and is provided at that end with a spade, C. In the lower part of the seed-box A, below the bottom G, is the dropping-roller D, which is provided on one side with a recess, $a$. In this recess is placed a slide, $b$, which is operated by means of a wire, $d$, passing out through the end of the roller, to increase or diminish the size of the space in which the seed falls to be carried around by the roller. The roller is operated by means of a slide, E, moving in guides $e\ e$ at one side of the seed-box, the movement of said slide being limited by a pin entering a slot in the slide, or by any other suitable means. From the lower end of the slide E a cord or band, $f$, connects with one end of the roller, around which it is wrapped. Around the opposite end of the roller is wound a spring, $h$, as shown. By pushing down the slide E the roller D is turned sufficiently to cause the seed-recess $a$ to be downward on the under side, and drop the seed contained therein into the hollow shank B. As soon as the pressure is removed from off the slide E the spring $b$ at once turns the roller backward to its original position, a pin, $x$, in the side of the roller striking the under edge of the seed-box, stopping the movement of the roller, and insuring its being held in proper position to receive seed from the seed-box in the recess $a$. The bottom G of the seed-box has an aperture, $y$, with converging sides, and one side, $m$, is made loose and attached to an elastic band, $i$, attached to the under side of the bottom at this side. This elastic band forms a scraper, to prevent more than the desired amount of seed from being carried out. The loose side $m$ being inclined, as shown, and the elastic band attached thereto, prevents the band from being pressed down upon the roller by the weight of the seed. At the upper end of the box A is formed a handle, H, by which the machine is held and handled, the operator having his thumb upon the end of the slide E.

The operation is substantially as follows: The operator, after filling the seed-box with seed through a slide in its top and regulating the slide $b$, thrusts the spade into the ground in an inclined position. He then pushes the slide E downward with his thumb, which causes the roller to revolve and carry the seed from the box into the hollow shank; but immediately preceding this he straightens the shank to a perpendicular position. The spade thus makes an opening by its side for receiving the seed. When the spade is withdrawn from the ground the earth falls over the seed and covers it. If it does not, it can easily be pushed over the seed with the spade.

Having thus fully described my invention, what I claim as new, and desire to secure by Letters Patent, is—

The combination, with the seed-box A and hollow shank B, of the roller D, having seed-recess $a$, with adjustable slide $b$, band $f$, slide E, and spring $h$, all constructed substantially as and for the purposes herein set forth.

In testimony that I claim the foregoing I have hereunto set my hand and seal this 28th day of May, 1874.

ABIEL D. HUNTLEY. [L. S.]

Witnesses:
JAMES FRANK HOLLAND,
JAMES W. BROWN.